United States Patent Office 2,698,853
Patented Jan. 4, 1955

2,698,853

OXIDATION OF STEROIDS

Bernard S. Wildi, Dayton, Ohio, assignor to Monsanto Chemical Company, St. Louis, Mo., a corporation of Delaware No Drawing. Application August 11, 1951,
Serial No. 241,491

10 Claims. (Cl. 260—397.2)

This invention relates to a new and improved method of converting the esters of sterols containing unsaturation in the 5,6-position into 7-keto derivatives. More specifically, the invention relates to the oxygen oxidation of the sterol esters to form intermediates useful in the synthesis of cortisone.

Both the raw materials and the products of the novel oxidation method are known to the art. Furthermore, air and oxygen oxidations of these sterols and their esters are also described in the published literature. However, the prior art methods have utilized aqueous colloidal suspensions, necessarily dilute and productive of low yields and conversions.

The primary purpose of this invention is to provide an improved method of sterol oxidations, which is more readily practicable and by which substantial conversions to the desirable ketone products are obtained. A further purpose of this invention is to provide a more useful procedure for preparing the 7-keto derivatives from sterol esters having 5,6-unsaturation.

In accordance with this invention various sterols with 5,6-unsaturation are first converted to the esters by reaction with acetic acid, benzoic acid or other suitable blocking agents. The nature of this agent is immaterial since in normal synthesis procedures the blocking is subsequently removed. The sterol with the hydroxyl group blocked, for example, by esterification, is heated in the presence of gaseous oxygen and an alkyl-substituted hydrocarbon at temperatures of from 100° C. to 160° C. The products of oxidation which include substantial proportions of the 7-keto derivative of the sterol ester may be readily separated from the reaction medium by conventional procedures. The method may be practiced with air, oxygen, or any mixtures thereof.

Suitable alkyl-substituted hydrocarbons useful in the practice of this invention are toluene, xylene, ethylbenzene, cumene, cymene, and other substituted benzenes with one or more alkyl radicals. Although the alkylbenzenes do serve as a solvent medium, they are not inert under the conditions of reaction. Being oxidizable themselves, they serve as chain-transfer agents in providing the free radicals to initiate and promote the oxidation of the sterols.

The sterol esters which may be oxidized in accordance with the present method may be represented by the following structural formula:

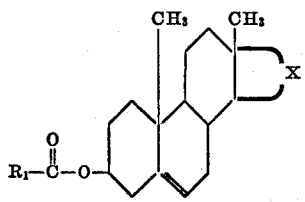

wherein R₁ is an alkyl, aryl or aralkyl radical depending upon the acid used in blocking the hydroxyl group, and the X is a substituted 5-carbon saturated ring structure, fused to the 13- and 14-carbon atoms to provide the perhydrocyclopentenophenanthrene ring structure. In the practice of this invention the raw materials may be obtained by esterifying cholesterol, sitosterol, stigmasterol, campesterol, fucosterol, and other sterols having unsaturation in the 5,6-position. Esters of this type may be represented by the following structural formula:

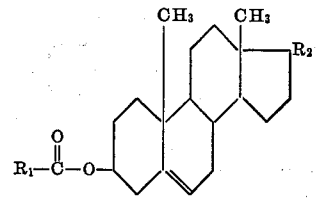

wherein R₁ is the hydrocarbon radical of the esterifying acid and R₂ is a long aliphatic chain which differs slightly among the various sterols.

Other sterol-type esters are also useful, for example those derived from diosgenin which have the following structure:

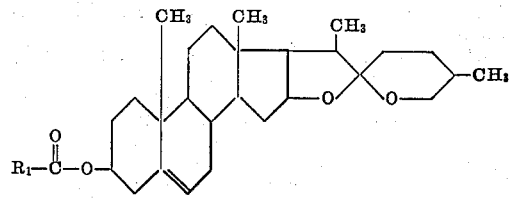

Other sterol type esters useful in the practice of this invention are those having different substituents on the 5-membered ring, for example those in which the normal sterol side chain has been degraded, for example by a separate oxidation to form a relatively short chain or even a ketone radical in the 5-membered ring. In some cases, the side chain may become degraded during the air oxidation, in which case the 7-keto derivative obtained will have the normal side chain modified. In all cases, however, the 7-keto derivatives will have the following structure:

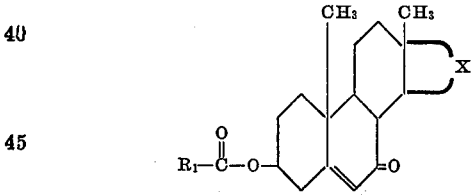

wherein the R₁ group is the hydrocarbon derivative from the esterifying acid and the X group is the substituted fused 5-membered ring structure.

The new method is useful in the preparation of intermediates in the preparation of useful therapeutic agents, particularly cortisone.

Further details of this invention are set forth with respect to the following specific example:

*Example*

A reaction flask provided with a rotary stirring device and an oxygen inlet tube was charged with 50 grams of cholesterol acetate, 350 grams of cumene, ten grams of sodium bicarbonate and ten grams of cumene hydroperoxide. The mixture was heated at 130° C. for six hours while oxygen was passed into the agitated solution. During the reaction the cumene hydroperoxide content reached a maximum of 23.8 per cent. The mixture was filtered and the filtrate evaporated in a vacuum to a volume of about 60 ml. Methyl alcohol was added and upon cooling a substantial yield of a solid product was obtained. Upon recrystallization a white solid substance with a melting point of 156 to 157° C. was recovered and identified as 7-cholestenone acetate with the structural formula:

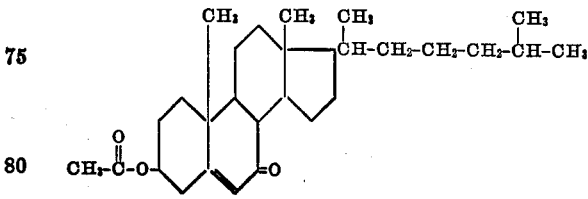

The invention is defined by the following claims.
What I claim is:

1. A method of preparing 7-keto derivatives of sterol esters which comprises heating at a temperature of from 100° C. to about 160° C. compounds having the structural formula:

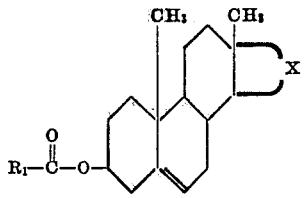

wherein $R_1$ is a hydrocarbon radical and X is a substituted 5-membered saturated ring, fused to the 13- and 14-carbon atoms, in the presence of gaseous oxygen and an alkyl-substituted benzene.

2. The method defined by claim 1 wherein the alkyl-substituted benzene is cymene.

3. The method defined by claim 1 wherein the alkyl-substituted benzene is cumene.

4. The method defined by claim 1 wherein the alkyl-substituted benzene is ethylbenzene.

5. The method of preparing 7-cholestenone acetate which comprises heating at a temperature of from 100° C. to about 160° C. cholesterol acetate in the presence of gaseous oxygen and an alkyl-substituted benzene.

6. The method of preparing 7-stigmastenone acetate which comprises heating at a temperature of from 100° C. to about 160° C. stigmasterol acetate in the presence of gaseous oxygen and an alkyl-substituted benzene.

7. The method of preparing 7-sitostenone acetate which comprises heating at a temperature of from 100° C. to about 160° C. sitosterol acetate in the presence of gaseous oxygen and an alkyl-substituted benzene.

8. The method of preparing 7-campestenone acetate which comprises heating at a temperature of from 100° C. to about 160° C. campesterol acetate in the presence of gaseous oxygen and an alkyl-substituted benzene.

9. The method of preparing 7-keto derivative of acetylated diosgenin by heating at a temperature of from 100° C. to about 160° C. the acetylated diosgenin in the presence of oxygen and an alkyl-substituted benzene.

10. The method of preparing 7-keto derivatives of 5,6-unsaturated sterol esters, which comprises heating a sterol ester, wherein the carboxyl-free portion of the esterifying acid is a hydrocarbon radical and the steroid is selected from the group consisting of cholesterol, sitosterol, stigmasterol, campesterol, fucosterol and diosgenin, dissolved in an organic liquid solvent and chain-transfer agent selected from the alkylbenzenes at from 100° C. to about 160° C. in the presence of gaseous oxygen.

References Cited in the file of this patent
UNITED STATES PATENTS

| 1,884,274 | Sandgvist et al. | Oct. 25, 1932 |
| 2,386,635 | Rosenberg | Oct. 9, 1945 |
| 2,400,380 | Wintersteiner | May 14, 1946 |

FOREIGN PATENTS

| 467,376 | Great Britain | June 16, 1937 |

OTHER REFERENCES

Meyer: Jour. Biol. Chem., 103, 607–616 (1933).
Bergstrom: Jour. Biol. Chem., 145, 327–333 (1942).